(12) United States Patent
Maile

(10) Patent No.: US 8,899,117 B2
(45) Date of Patent: Dec. 2, 2014

(54) FOOD MACHINE, IN PARTICULAR MACHINE FOR PROCESSING AND PRODUCING SAUSAGE, AND METHOD OF OPERATING THE SAME

(71) Applicant: Albert Handtmann Maschinenfabrik GmbH & Co. KG, Biberach (DE)

(72) Inventor: Bernd Maile, Oggelshausen (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 93 days.

(21) Appl. No.: 13/660,139

(22) Filed: Oct. 25, 2012

(65) Prior Publication Data

US 2013/0098169 A1   Apr. 25, 2013

(30) Foreign Application Priority Data

Oct. 25, 2011   (EP) .................................... 11186508

(51) Int. Cl.
*G01L 1/00*   (2006.01)
*A22C 11/08*   (2006.01)
*A22C 11/02*   (2006.01)

(52) U.S. Cl.
CPC ............. *A22C 11/08* (2013.01); *A22C 11/0245* (2013.01)
USPC .................................................... 73/862.541

(58) Field of Classification Search
CPC .. A22C 11/08; A22C 11/0245; G05B 19/058; G05B 2219/14114; G05B 2219/1109
USPC .................................................... 73/862.541
See application file for complete search history.

(56) References Cited

U.S. PATENT DOCUMENTS

| | | | | |
|---|---|---|---|---|
| 3,953,770 | A | * | 4/1976 | Hayashi ......................... 361/179 |
| 4,456,093 | A | * | 6/1984 | Finley et al. .................... 182/2.2 |
| 4,480,738 | A | * | 11/1984 | Mattson ..................... 198/346.1 |
| 6,132,302 | A | * | 10/2000 | Hiller et al. ..................... 452/45 |
| 7,124,872 | B2 | * | 10/2006 | Poser ............................. 192/130 |
| 2004/0218317 | A1 | * | 11/2004 | Kawazu et al. ................... 361/1 |
| 2005/0161591 | A1 | * | 7/2005 | Bergbach ....................... 250/221 |
| 2006/0197020 | A1 | * | 9/2006 | Trzecieski et al. ............ 250/342 |
| 2009/0072508 | A1 | * | 3/2009 | Leitner et al. ................. 280/166 |
| 2010/0093495 | A1 | * | 4/2010 | Ozawa et al. ..................... 482/8 |
| 2011/0050878 | A1 | * | 3/2011 | Wells et al. ...................... 348/86 |
| 2011/0090040 | A1 | * | 4/2011 | Allen et al. .................... 340/3.1 |
| 2011/0288659 | A1 | * | 11/2011 | Nelson et al. ................... 700/21 |

FOREIGN PATENT DOCUMENTS

EP   2384635 A2   11/2011

OTHER PUBLICATIONS

European Search Report for 11186508.5, dated Apr. 24, 2012.
"European Norm EN 12463:2004 for Food manufacturing equipment, Filling machines (food), Meat, Equipment safety, Safety measures, Hazards, Occupational safety, Hygeine, Verification", European Norm EN 12463:2004, Nr. European Norm EN 12463:2004, Jan. 1, 2011, Seiten 26-32, XP008150251.

* cited by examiner

*Primary Examiner* — Lisa Caputo
*Assistant Examiner* — Philip Cotey
(74) *Attorney, Agent, or Firm* — Marshall, Gerstein & Borun LLP

(57) ABSTRACT

A food machine, in particular a machine for processing and producing sausage, with a step, and a corresponding method, wherein the food machine includes a safety device for detecting whether a person is standing on the step when the step is in a projecting step-on position.

18 Claims, 2 Drawing Sheets

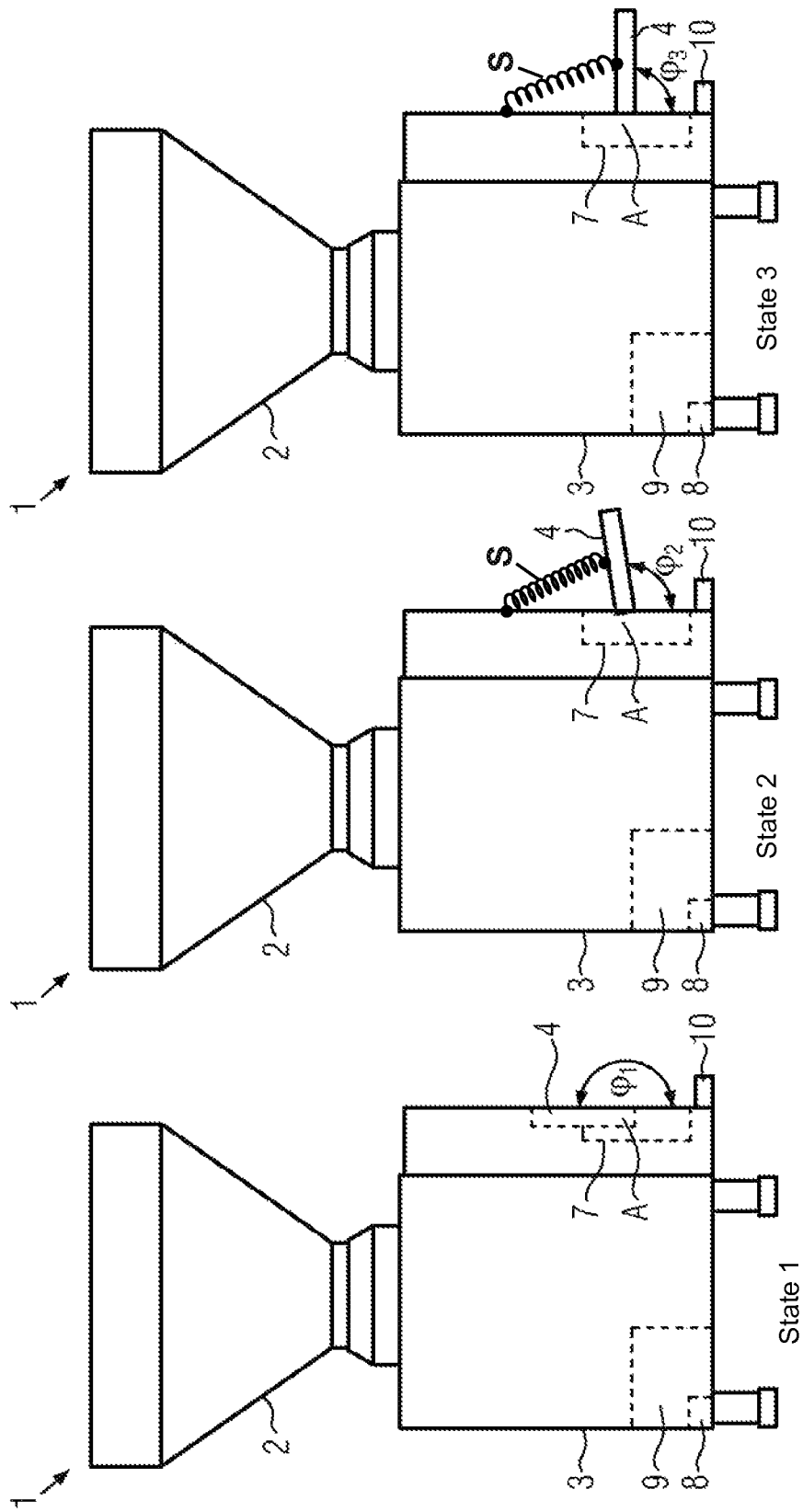

FOOD MACHINE, IN PARTICULAR MACHINE FOR PROCESSING AND PRODUCING SAUSAGE, AND METHOD OF OPERATING THE SAME

CROSS-REFERENCE TO RELATED APPLICATION

The present application claims the benefit of priority of European Application No. 11186508.5, filed Oct. 25, 2012. The entire text of the priority application is incorporated herein by reference.

FIELD OF THE DISCLOSURE

The disclosure relates to a food machine, in particular a machine for processing and producing sausage, with a step, and a corresponding method.

BACKGROUND

In the food industry, corresponding steps are attached to the production apparatuses and machines or integrated into the production machines for monitoring and control purposes. The machine and the step must be coordinated such that the respectively applicable safety and ergonomic provisions are complied with. The step is part of the safety concept of the machine and firmly connected to the latter.

The step is often designed such that it can be transferred from a compact rest position (e. g. a folded-in state) to a projecting working position (folded-out state), e. g. by manually folding out the step. The step is here designed to be coupled in accordance with the safety concept. This means that the machine is unlocked when the step is folded up, while the machine is locked in a folded down step position. After the step has been folded up, this must be first confirmed at the input unit so that the machine can then be operated again without restrictions.

Loose steps, i.e. steps that are freely movable in the production plant, e. g. in the form of platforms, ladders, steps, etc., are not accepted for safety reasons. This is because these movable steps can be easily brought, e. g. by the operators, to the immediate proximity of sources of danger without using tools. Since these steps are not coupled to the machine's safety concept, the machine will still be running even when someone steps on the movable step, even if it has been brought perilously close to a danger point. Thus, the compliance with the required safety dimensions (distance to the source of danger) cannot be reliably ensured. This represents a high potential for danger, e. g. for the operator or the cleaning staff.

By a coupled step being part of the machine's safety concept and the machine only being operative when the step is folded up, the step must be more or less often manually transferred to the various positions every day, depending on the application. Since the operators are often carrying heavy loads and thus their hands are not free, it is particularly disadvantageous to have to operate the step manually.

SUMMARY OF THE DISCLOSURE

Starting from this situation, one aspect of the present disclosure is to provide a device and a method that facilitate the operating sequence, wherein the constant folding up and down of a step is eliminated, while the safety of the machine is not affected.

According to the disclosure, the food machine comprises a step coupled to the machine on which a person can stand for operating and monitoring purposes. The food machine in particular provides a safety device which detects whether a person is standing on the step when the step is in a projecting step-on position. Projecting step-on position is defined as a position of the step in which the step projects beyond the machine frame or housing such that a person can stand on the step, or the housing or frame of the machine comprises a corresponding recess such that a person can stand on the step. If it is detected that a person is standing on the step, the functions of the food machine can be at least partially blocked. By it being possible to detect a person located on the step, it is not necessary to transfer a step into a rest position (e. g. folded-in state) before the food machine can be operated again to its full extent. It is thus also possible to unlock the machine when the step is arranged in a step-on or working position, respectively, and the safety device detects that no person is located on the step. Thus, the constant folding up and down or retracting the step is eliminated.

Advantageously, the food machine comprises a controlling system which at least partially locks or unlocks the functions of the food machine in response to a signal generated by the safety device. This means that, when it is detected that the step is in a loaded state, the functions of the food machine are at least partially locked, in particular at least the active movements, such as, for example, the movement of the conveyor system in a sausage machine. As soon as it is detected that no person is standing on the step any longer, the machine can be unlocked again by the operator and used to its full extent.

According to a preferred embodiment, the safety device comprises at least one measuring apparatus for this. The device can comprise, for example, a measuring apparatus for detecting the step-on load, i.e. for example an apparatus for detecting the force acting on the step-on surface (e. g. a pressure cell, a pressure sensitive mat, a strain gauge, etc.). A measuring apparatus can also be used for detecting a position of the step that has changed due to the step-on load, in particular an angle sensor for measuring the angle $\phi$ between the step and a reference plane, or one or several position sensors or switches. As an alternative to the measuring apparatuses which supply a signal on the basis of the step-on load or the force acting on the step, an optical measuring apparatus for detecting a person on the step can also be used, in particular an optical sensor or a camera.

Advantageously, the safety device comprises an evaluation unit which receives a measuring signal from a measuring apparatus and detects, depending on the signal, whether a person is standing on the step. This measuring apparatus can be integrated in the controlling system.

According to a preferred embodiment, the evaluation unit comprises a comparison apparatus for comparing the measuring signal of the measuring apparatus with a comparative value. Thus, errors can be masked, for example. With a load of, for example, <10 kg, the evaluation unit then determines that there is no person on the step.

The present disclosure permits embodiments in which the step can always remain in a projecting step-on position. However, it is also advantageous if the step can be transferred into a not projecting rest position, so that it does not disturb by projecting from the machine when it is not required. So, the step can be transferred from a not projecting rest position to the projecting working position with a corresponding drive by actuating a switch. It is particularly advantageous to provide a foot actuated switch. Thus, the operators can also move the step when their hands are not free. Advantageously, the safety device is then designed such that it can detect with a corresponding measuring apparatus, whether the step is in a not projecting rest position. In this case, too, the functions of the food machine can be unlocked.

Advantageously, the step is arranged such that it changes its position in a projecting working position when it is loaded and automatically returns to its unloaded state when it is unloaded, where a measuring apparatus of the safety device can then detect the position of the step.

In accordance with the disclosure, it can be detected, for example, whether the step is a) in a not projecting rest position, or b) in a projecting working position without any load by a person, or c) in a projecting working position with a load by a person. In case c), the functions of the food machine (1) are at least partially locked, and in case a) or b), the functions of the food machine are unlocked.

Via a position switch, the safety device (7, 8) can detect the position that has changed due to the step-on load of a person, wherein the position switch interrupts the drive current or supply current for at least one function of the food machine.

BRIEF DESCRIPTION OF THE DRAWINGS

The present disclosure will be illustrated below in greater detail with reference to the following figures.

FIG. 1 shows an embodiment of a food machine according to the present disclosure in a schematic representation, in which the step is in a not projecting rest position.

FIG. 2 shows the food machine shown in FIG. 1 in which the step is in a projecting step-on position without load by a person.

FIG. 3 shows the food machine shown in FIGS. 1 and 2 in which the step is in a projecting step-on position with a load by a person.

DETAILED DESCRIPTION OF THE PREFERRED EMBODIMENTS

Figure 4:
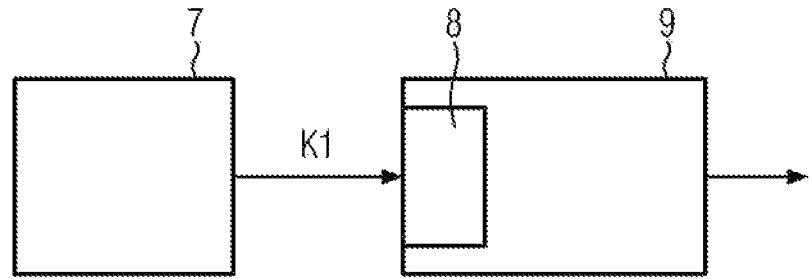
FIG. 4 generally schematically shows the safety device and the controlling system.

FIG. 1 roughly schematically shows a food machine according to an embodiment of the present disclosure. In this case, it is a machine for processing and producing sausage, here in particular a filling machine. However, the embodiment is not restricted to a filling machine. The filling machine here comprises a hopper 2 and a machine housing 3. In the lower region of the food machine 1, a step 4 is provided which is fixed to the food machine 1 and is in a first state in FIG. 1, i. e. in a folded-in rest position. For this, the step 4 can be mounted to be pivoted, for example, about an axis A. FIG. 2 corresponds to the embodiment represented in FIG. 1; here, however, the step 4 is disposed in a second state in which it is in a projecting step-on position. While the angle $\phi 1$ is, for example, in the folded-in state between the bottom surface of the step and a reference plane, which for example comprises the vertical housing surface, $\geq 170°$, the angle $\phi 2$ is in the folded-open state e. g. in a range between 92 and 95 degrees.

FIG. 3 shows the plant shown in FIG. 2, the step being here in a third state, that is in a projecting step-on position being loaded by a person. As will be illustrated more in detail below, $\phi 3$ can here either correspond to $\phi 2$ or, corresponding to a preferred embodiment as it will be illustrated in connection with FIG. 3, it can be smaller than $\phi 2$. In this preferred embodiment, the step 4 is preloaded to the state 2, in particular by a not represented spring counteracting to it. With a step-on load, the angle $\phi 2$ is therefore reduced. The step 4 can be transferred from the rest position shown in FIG. 1 to the projecting step-on position as it is represented in FIG. 2, for example via a switch, advantageously via the foot actuated switch 10. So, by the switch 10 and a corresponding drive (e. g. a gas spring or an electric or pneumatic drive, a mechanical drive with a counterbalance weight, etc.), the step 4 can be transferred from the state 1, i. e. the rest position, to the state 2, i. e. the step-on position, and vice-versa.

However, the present disclosure is not restricted to a pivoting step 4. While this is not represented, the step 4 could also be traversed from a projecting step-on position into the interior of the housing 3 or the frame by a corresponding switch 10, in particular a foot actuated switch 10, and a drive, and from this rest position again to the outside into the step-on position, also by actuating the switch 10.

Since a certain hazard potential emanates from the actively moving parts of the food machines, it must be ensured that in the state 3, in which an operator is standing on the step 4, corresponding functions are not performed by the food machine. In a sausage machine, corresponding active movements involving a potential for danger are, for example, the movement of the conveyor system in the hopper, or that of the feeder cam, of an agitator, etc.

For this reason, a safety device 7, 8 is provided according to the present disclosure for detecting whether a person is standing on the step 4 when the step 4 is in a projecting step-on position, i.e. in state 3. If it is detected that a person is located on the step 4, the dangerous functions of the food machine 1 can be at least partially locked.

The safety device 7, 8 preferably comprises a measuring apparatus 7 to this end. Advantageously, a measuring apparatus for detecting the step-on load is provided. The measuring apparatus 7 for detecting the step-on load can either be a measuring apparatus for detecting a position of the step that has changed due to the step-on load, or for detecting a force acting on the step.

As can be taken from FIGS. 2 and 3, the position of the step changes when the step 4 is loaded, such that the angle $\phi 3$ is $<\phi 2$. By the preload of the step 4, the step is automatically returned to the unloaded state 2 when it is relieved. The measuring apparatus 7 can here detect the position of the step 4. This can be either done by measuring the angle $\phi$, for example by an angle sensor. By the angle sensor, one can, for example, also determine the angle $\phi 1$, so that the state 1 can also be detected via this measuring apparatus.

As can also be taken in particular from FIG. 4, the measuring apparatus 7 sends a signal K1 to an evaluation apparatus 8, which compares, for example, the measured value K1 with a comparative value and then determines whether the step 4 is in state 2 or 3. Particularly preferred, the evaluation unit 8 can also determine whether the step 4 is in state 1, i. e. in a non-operative state. The evaluation unit 8 then generates a corresponding signal, wherein, in response to the signal, the functions of the food machine 1 are at least partially locked or unlocked. The evaluation unit can be integrated in the control.

As an alternative to the angle meter, one or several position sensors or switches can also be provided. For example, a position switch can be arranged in a region corresponding to an angular position of the step 4 which results when a certain force acts on the step 4 which is greater than a predetermined comparative value (for example >10 kg). If a person is then standing on the step 4, the step 4 moves downwards, such that the switch is actuated, so that a corresponding signal is forwarded from the measuring apparatus 7 to the evaluation apparatus 8, as is represented in FIG. 4. A further position switch can be arranged, for example, in a region where the step 4 is in state 2. Here, too, a corresponding signal is then sent to an evaluation unit 8. Finally, a position sensor or switch can also be arranged in a region where it responds or is switched when the step 4 is in its rest position. It can then be detected, for example, in the evaluation unit which position sensor or switch responds and in which state the step 4 is. The controlling system 9 can then at least partially lock or unlock the functions of the food machine depending on the detected position. In the simplest case, the evaluation unit comprises a comparator or a logic gate or a switch.

As was already mentioned above, the measuring apparatus can, however, also be designed such that it does not detect the position that has changed due to the step-on load, but the force acting on the step-on surface 4, via a corresponding signal. For this, for example a pressure cell, a pressure sensitive mat, or a strain gauge can be provided on or in the step 4. Here, too, the measuring apparatus 7 sends the measuring signal K1 to an evaluation apparatus 8. The measuring apparatus 7 here comprises, for example, a comparing apparatus that compares the measured value K1 with a comparative value. If the measured value K1 is greater than a comparative value, e. g. 10 kg, it is determined that a person is located on the step. If the measured value K1 is smaller than the comparative value, it is assumed that no person is located on the step. Thus, the accuracy of the safety device can be still further improved.

According to a further preferred embodiment, an optical measuring apparatus can be provided as a measuring apparatus 7. This measuring apparatus can comprise, for example, at least one optical sensor which is arranged in a region in which the person is standing and which detects whether a person is standing on the step 4. The sensor can be designed, for example, in the form of a light barrier, wherein the measuring apparatus 7 generates, when a person 6 passes the light barrier, a corresponding signal K1 that can be e. g. sent to the evaluation unit 8 or the controlling system 9 (see FIG. 4). The sensor can also be embodied, for example, in the form of a laser scanner.

As an optical measuring apparatus, a camera, for example a CCD camera, can also be provided which sends corresponding signals K1 to an evaluation unit 8 which compares the signals with comparative values to detect whether a person is located on the step 4, where then the controlling system 9 correspondingly controls the functions.

In the above described embodiments, a signal generated by the measuring apparatus is used by the controlling system via an evaluation unit 8 to then at least partially lock or unlock the functions of the food machine. However, it is also possible that the safety device 7, 8 detects, via a position switch, the position of the step 4 that has changed due to the step-on load of a person 6, as it is represented in FIG. 3, where the drive current or the supply current for at least one function of the food machine is simultaneously interrupted via this switch.

In this case, the safety device is embodied as hardware interlock and does not run via the controlling system. When the person 6 leaves the step again, the step 4 automatically assumes a position in state 2, as was illustrated in greater detail in connection with the previous embodiment.

Figure 5:
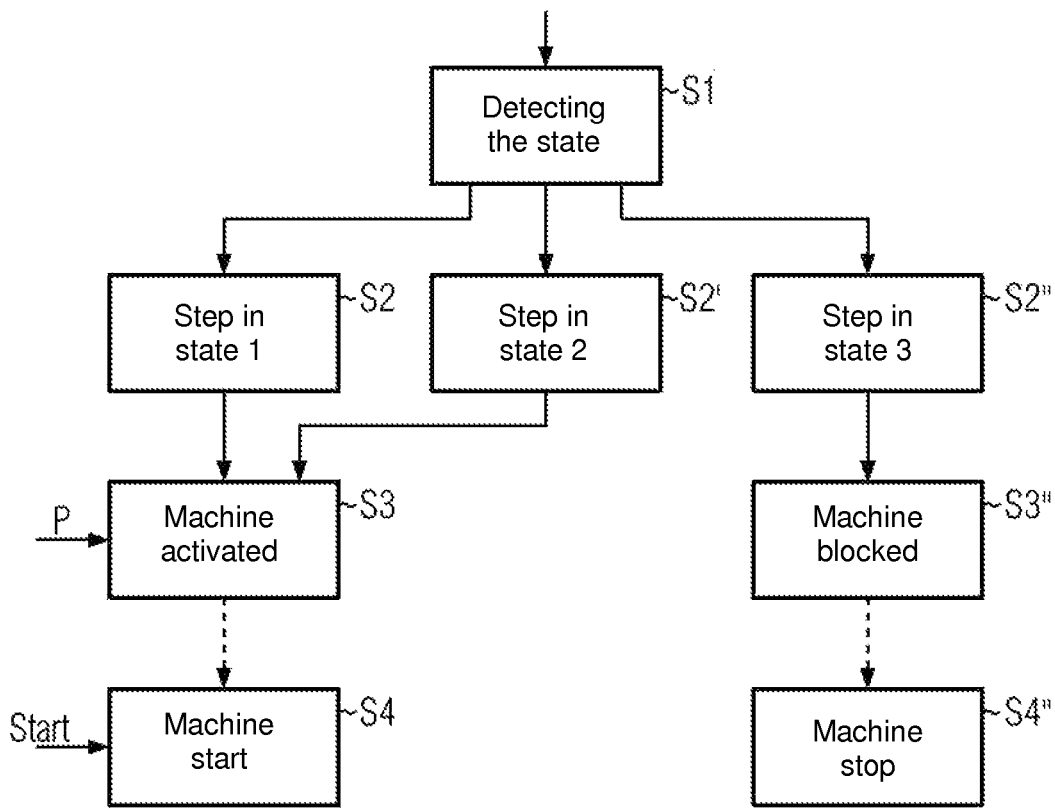
FIG. 5 generally schematically shows a flow chart of a possible embodiment of the method according to the disclosure.

The method according to the disclosure will be illustrated more in detail with reference to FIG. 5.

First, the state of the step 4 is detected (step S1). It is in particular detected via a measuring apparatus 7 whether the step 4 is in state 1 (S2), i. e. in the rest position, or whether the step 4 is disposed in state 2 (S2'), i. e. in the unloaded step-on position, or else in state 3 (S2"), i. e. in the step-on position loaded by a person 6. If it is detected via a measuring apparatus 7 that the step is in state 1, the functions of the food machine 1 are unlocked (S3). The expression unlocking here only relates to this safety system, i. e. excluding any risk for a person standing on the step by moving parts. If the machine includes still further safety systems, at least one further release signal P must be generated so that actually all functions are unlocked. This means that in this state, an already running food machine can continue without restrictions, or that the machine can start (S4) with a starting command.

If it is detected that the step is in state 2, i. e. in an unloaded step-on state (S2'), the machine is also unlocked, as was described in connection with state 1.

If, however, a loaded state 3 (S2") is detected, in a step S3", the machine is at least partially blocked such that at least active movements of the machine 1 are blocked. This means that with the machine running, corresponding functions are stopped (S4"), or corresponding functions cannot be started.

If the step 4 is in a step-on position loaded by a person and the person leaves the step 4 again, it is detected via the safety device 7, 8 that the step has turned again from state 3 to state 2. The safety system can be switched such that then, in the transition from state 3 to state 2, an additional unlocking input (see e. g. P) is required so that the corresponding functions can be put into operation again. The method according to the disclosure is continuously performed as soon as the machine is switched on. Thus, safe operation is ensured.

The invention claimed is:

1. A food machine, comprising:
    a step configured to change positions between an unloaded step-on position, a loaded projecting step-on position, and a not projecting rest position; and
    a safety device that detects whether a person is standing on the step when the step is in the loaded projecting step-on position,
    wherein the step is coupled to the food machine via a spring such that the step changes from the unloaded projecting step-on position to the loaded projecting step-on position when the step is loaded, and when the load is relieved the step automatically returns to the unloaded projecting step-on position via counteraction of the spring, and
    wherein a measuring apparatus of the safety device detects whether the step is in the loaded projecting step-on position, and
    wherein the safety device at least partially locks the function of the food machine when the loaded projecting step-on position is detected.

2. The food machine according to claim 1, wherein the functions of the food machine are at least partially locked or unlocked depending on a signal generated by the safety device.

3. The food machine according to claim 1, wherein the safety device comprises at least one of the following measuring apparatuses:
    a measuring apparatus for detecting the step-on load, and
    an optical measuring apparatus.

4. The food machine according to claim 3, wherein the measuring apparatus comprises, for detecting a step-on load, either:
    a measuring apparatus for detecting a force acting on the step, or
    a measuring apparatus for detecting a position of the step that has changed due to the step-on load.

5. The food machine according to claim 1, wherein the safety device comprises:
    an evaluation unit that receives a measuring signal from a measuring apparatus and detects, depending on the signal, whether a person is standing on the step.

6. The food machine according to claim 5, wherein the evaluation unit comprises:
a comparison apparatus for comparing the measuring signal with a comparative value.

7. The food machine according to claim 1, wherein the step is transferred from a not projecting rest position to the unloaded projecting step-on position with a corresponding drive by actuating a switch.

8. The food machine according to claim 1, wherein the safety device detects whether the step is arranged in a not projecting rest position.

9. The food machine according to claim 1, further comprising:
a safety device that detects when the step changes positions between the unloaded projecting step-on position to the loaded projecting step-on position when a person stands on the step.

10. The food machine according to claim 9,
wherein a measuring signal is generated via a measuring apparatus; and further comprising:
an evaluation unit that detects whether a person stands on the step based on the measuring signal.

11. The food machine according to claim 10, wherein the evaluation unit compares the measuring signal with a comparative value.

12. The food machine according to claim 9, wherein the safety device detects whether the step is in a:
a) not projecting rest position,
b) in the unloaded projecting working position without any load by a person, or
c) in the loaded projecting working position with a load by a person, and wherein the safety device:
at least partially locks the functions of the food machine in case c); and
unlocks the functions of the food machine in either case a) or b).

13. The food machine according to claim 1, wherein the safety device detects, via a position switch, a position that has changed due to the step-on load of a person, and
wherein drive current or supply current for at least one function of the food machine is interrupted via the position switch.

14. The food machine according to claim 1, wherein the food machine is configured to process and produce sausage.

15. The food machine according to claim 2, wherein the functions of the food machine are at least partially locked or unlocked by a controlling system.

16. The food machine according to claim 4, wherein the measuring apparatus for detecting a position of the step that has changed due to the step-on load comprises one or more of:
an angle sensor to measure the angle between the step and a reference plane; and
one or several position sensors or switches.

17. The food machine according to claim 7, wherein the switch is a foot-actuated switch.

18. The food machine according to claim 1, wherein the functions of the food machine that are at least partially locked include at least active movements of the food machine.

* * * * *